(12) United States Patent
Mitchell et al.

(10) Patent No.: US 10,333,704 B2
(45) Date of Patent: Jun. 25, 2019

(54) ENCRYPTION GENERATION FOR MULTIPLE INSERTED DEVICES WITH GRAPHICAL USER INTERFACE INTERACTION

(71) Applicant: INTERNATIONAL BUSINESS MACHINES CORPORATION, Armonk, NY (US)

(72) Inventors: Elizabeth Mitchell, Cary, NC (US); Jason L. Peipelman, Austin, TX (US); Chris Zukowski, Phoenix, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 349 days.

(21) Appl. No.: 14/996,665

(22) Filed: Jan. 15, 2016

(65) Prior Publication Data

US 2017/0207913 A1    Jul. 20, 2017

(51) Int. Cl.
*H04L 9/08* (2006.01)
*G06F 12/14* (2006.01)
(Continued)

(52) U.S. Cl.
CPC .......... *H04L 9/0861* (2013.01); *H04L 63/06* (2013.01); *H04L 63/10* (2013.01); *H04L 63/0435* (2013.01); *H04L 67/1097* (2013.01)

(58) Field of Classification Search
CPC ......... H04L 9/0861; H04L 63/10; H04L 9/00; H04L 9/32–9/3297; H04L 63/04–63/0492; H04L 63/08–63/0892; H04L 63/1408; H04L 63/1416; H04L 67/12; H04L 63/06; H04L 63/0435; H04L 67/1097; H04L 29/06; H04L 9/08; G06F 12/1408; G06F 12/1466; G06F 2212/1052; G06F 2212/154; G06F 15/16–15/18; G06F 21/00; G06F 21/30–21/46;
(Continued)

(56) References Cited

U.S. PATENT DOCUMENTS

2011/0119495 A1    5/2011    Daoud et al.
2011/0167276 A1    7/2011    Courtay
(Continued)

FOREIGN PATENT DOCUMENTS

EP    1785901 A1    5/2007

OTHER PUBLICATIONS

Anonymous, "Designing State Machine via Table Entry with Automatically Generated Graphics Illustration", An IP.com Prior Art Database Technical Disclosure; http://ip.com/IPCOM/000169467.
(Continued)

*Primary Examiner* — Ashokkumar B Patel
*Assistant Examiner* — Quazi Farooqui
(74) *Attorney, Agent, or Firm* — Griffiths & Seaton PLLC

(57) ABSTRACT

Various embodiments for encryption enablement in a computing storage environment, by a processor device, are provided. In one embodiment, a method comprises managing each step of an encryption key creation process for a computer storage system using an automated wizard by interactively sensing inserted access key hardware and providing a real-time progress and error report of the encryption key creation process.

15 Claims, 9 Drawing Sheets

(51) Int. Cl.
*H04L 29/06* (2006.01)
*H04L 29/08* (2006.01)

(58) Field of Classification Search
CPC ...... G06F 21/60–21/645; G06F 21/554; G06F 2221/033; G06F 9/00; G06F 12/14; H04N 7/167; H04W 12/00
USPC ........................................ 713/189, 193, 165
See application file for complete search history.

(56) References Cited

U.S. PATENT DOCUMENTS

2012/0221865 A1* 8/2012 Hahn ................. H04N 21/4331
  713/193
2015/0120862 A1* 4/2015 Erickson ............. G06F 11/1435
  709/216

OTHER PUBLICATIONS

IBM, "LPAR-Deployment Wizazd-deployment methodology for self-awareness, adaptability, and recoverability", Apr. 9, 2007, An IP.com Prior Art Database Technical Disclosure; http://ip.com/IPCOM/000149835.
Anonymous, "Method for Optimized Wizard Navigation", An IP.com Prior Art Database Technical Disclosure; http://ip.com/IPCOM/000236796.

* cited by examiner

ENCRYPTION GENERATION FOR MULTIPLE INSERTED DEVICES WITH GRAPHICAL USER INTERFACE INTERACTION

BACKGROUND OF THE INVENTION

Field of the Invention

The present invention relates in general to computing systems, and more particularly, to various embodiments for encryption key enablement in computer storage environments.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. These computer systems may also include virtual storage components.

SUMMARY OF THE INVENTION

Various embodiments for encryption enablement in a computing storage environment, by a processor device, are provided. In one embodiment, a method comprises managing each step of an encryption key creation process for a computer storage system using an automated wizard by interactively sensing inserted access key hardware and providing a real-time progress and error report of the encryption key creation process.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
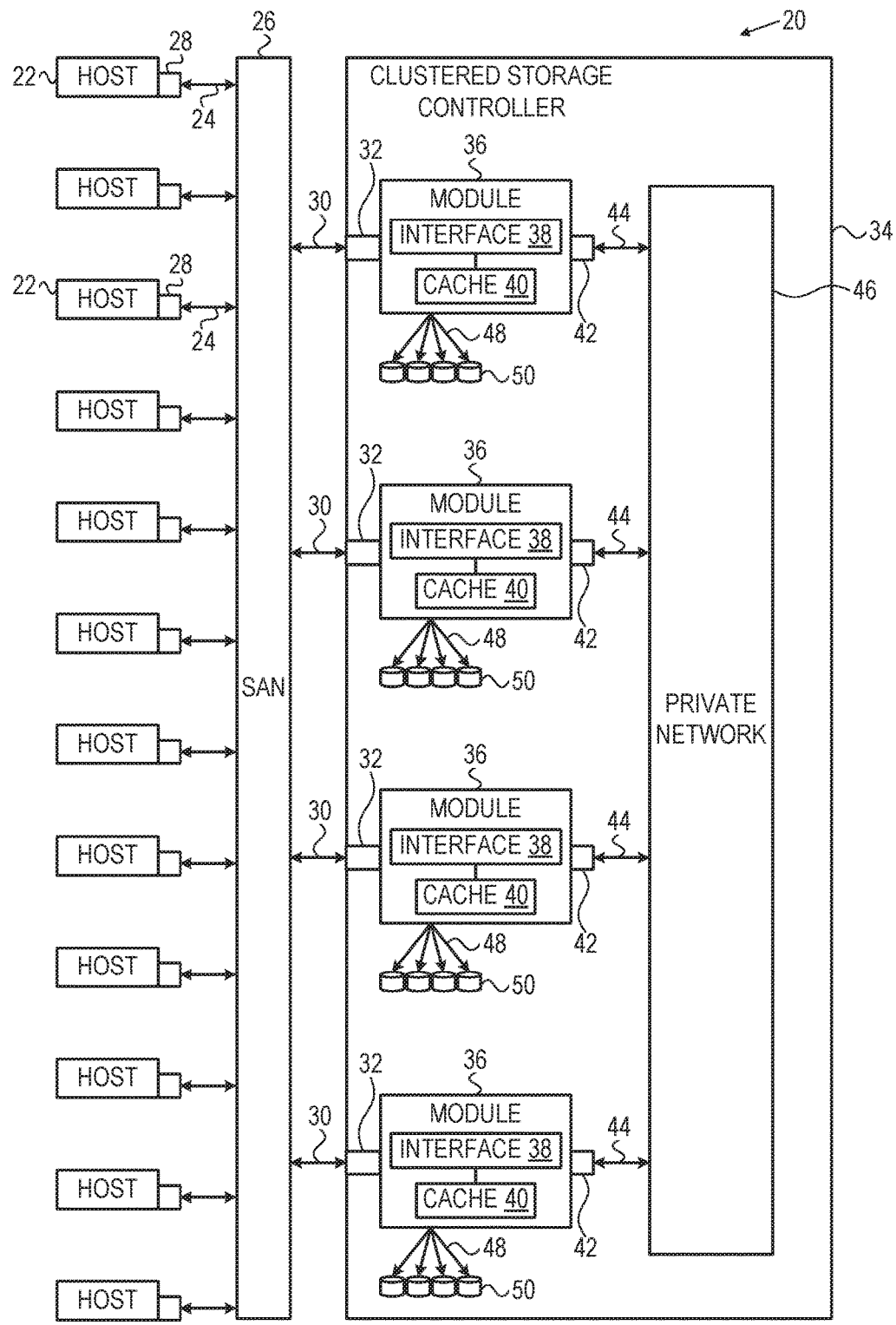
FIG. 1 is a block diagram illustrating a computer storage environment in which aspects of the present invention may be realized.

Described embodiments, and illustrative Figures of various embodiments for encryption key enablement in a computer storage system are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

To encrypt a computer storage system, encryption keys must be generated by the storage system and stored on a secure, external device. The secure external device allows a user to control the encryption state of the system and prevent unauthorized users from accessing secure data. A secure external device is comprised of access key hardware such as external encryption key servers, or external media devices, such as Universal Serial Bus (USB) storage drives.

USB storage drives are a cheaper solution than hosting the keys on an external server because they can be physically secured in a safe or locked room and do not require external power when not in use. However, USB storage drives pose challenges in their own right. These challenges include such factors as: A) Redundant encryption key data must be copied to multiple USB storage drives because storing encryption key data on only USB storage drives may be unreliable. Therefore, storage server users must manually repeat the same encryption key copying procedure among each of the USB storage drives to ensure a sufficient number of redundant copies of the encryption key data are produced; B) Storage servers may have a limited number of USB ports, requiring the user to swap encryption keys multiple times before producing the required number of redundant copies; C) Storage severs may be locked in a remote room or lab, making them difficult to access; and D) The storage server may not have a display monitor, thereby requiring any instructions to be presented via a separate computer that may be in a different room.

In view of the foregoing, the mechanisms of the illustrated embodiments provide various solutions to previous challenges of encryption enablement in computer storage systems. These mechanisms include such functionality as using an automated wizard to manage an encryption key enablement process, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
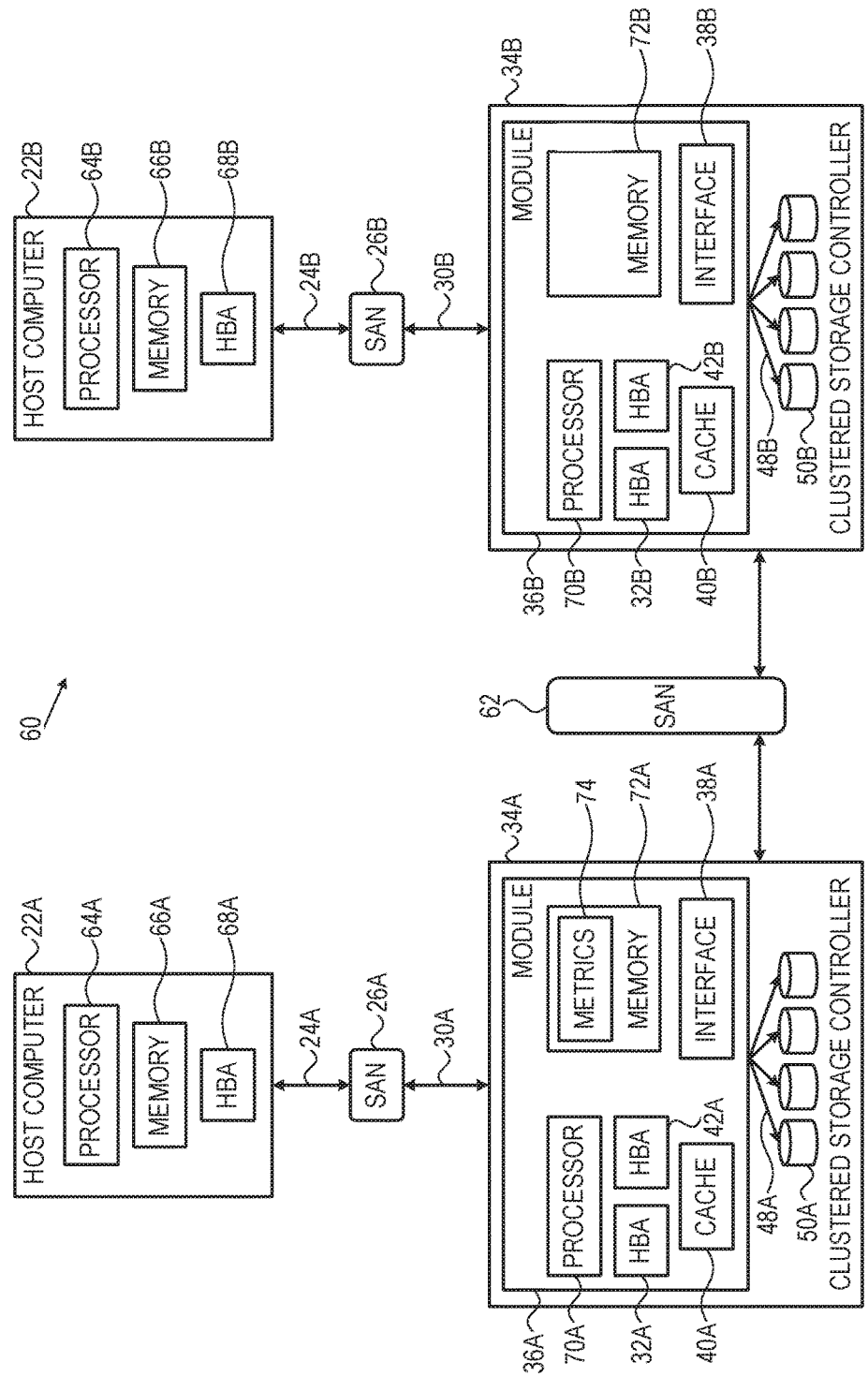
FIG. 2 is a block diagram illustrating a hardware structure of an exemplary data storage system in a computer system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
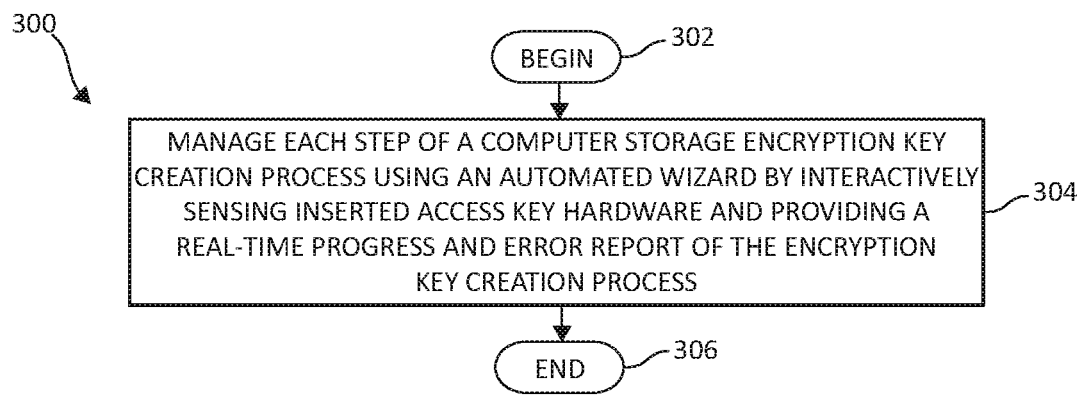
FIG. 3 is a flow chart illustrating a method for encryption enablement in a computer storage system in accordance with aspects of the present invention.

Continuing to FIG. 3, a method 300 for encryption key enablement in a computer storage system is illustrated, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 302, each step of an encryption key creation process for a computer storage system is managed using an automated wizard. The automated wizard interactively senses inserted access key hardware and provides a real-time progress and error report of the encryption key creation process (step 304). The method ends (step 306).

In various described embodiments, the present invention enables an automated wizard using a Graphical User Interface (GUI) component to automatically manage and report the step that the wizard is performing when creating the encryption keys. The user can also see short term progress of how much data has been copied to the access key hardware. As aforementioned, for exemplary purposes, the access key hardware referred to throughout the description comprises of USB storage drives, however, one skilled in the art would recognize that a variety of storage devices may be used as access key hardware for maintaining the encryption key data.

The automated wizard automatically monitors USB ports within the computing system and reacts to which access key hardware has been inserted, such that an experienced user may insert and remove all created encryption keys without ever looking at the display monitor. The automated wizard also maintains a log of each access key hardware copy that has been created, so the user can check past actions to determine whether the encryption keys were successfully created or not.

Figure 4:
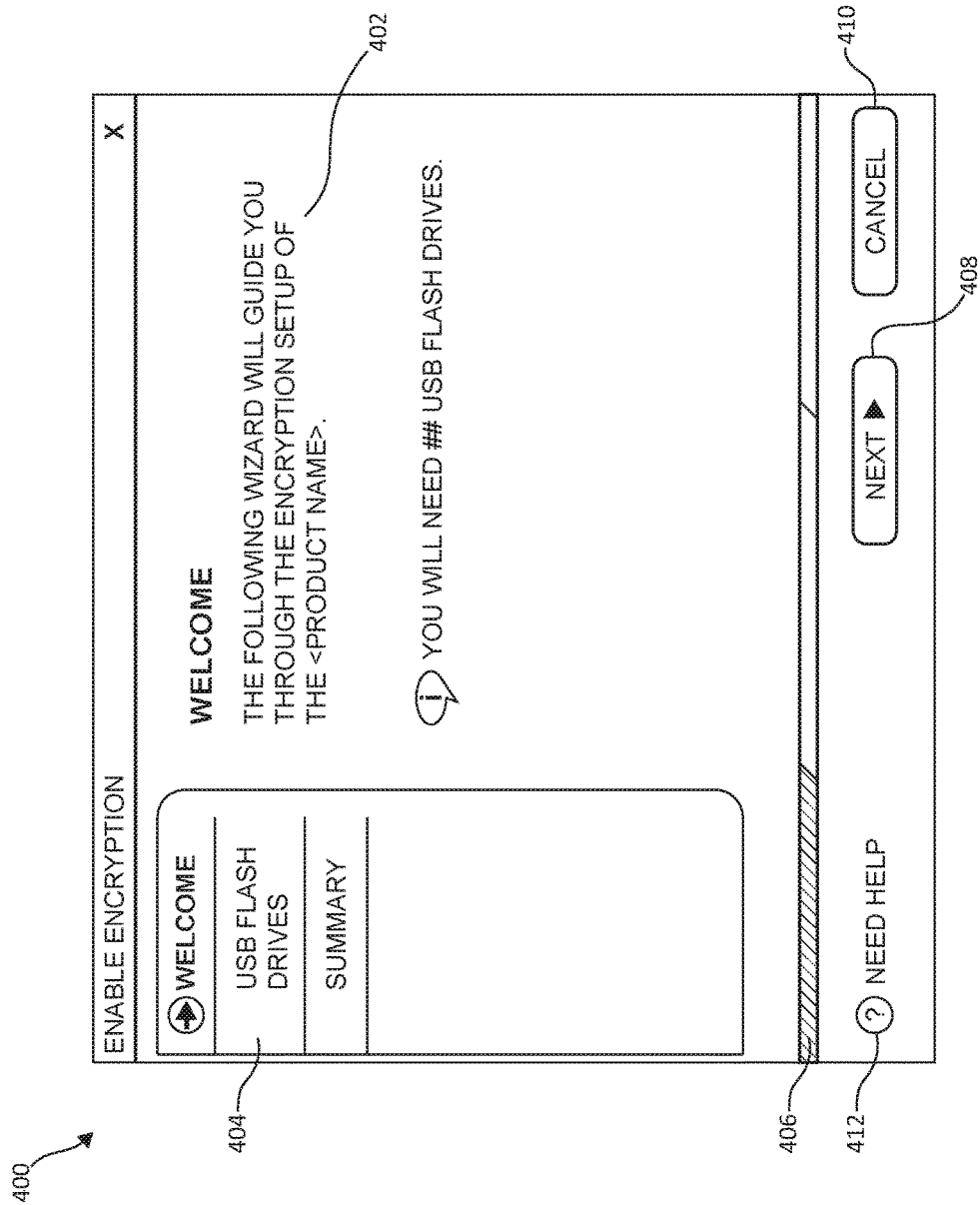
FIG. 4 is a block diagram illustrating an encryption key creation process in accordance with aspects of the present invention.

Advancing to FIG. 4, a block diagram 400 of an encryption key creation process is depicted. Diagram 400 is an illustrative screenshot of a welcome, or splash, screen of the automated wizard via the GUI component. Shown is a welcome prompt 402. Welcome prompt 402 may include programming instructions, such as providing a number of access key hardware devices that will need to be created during the encryption key creation process. Shown also is a progress display 404, a progress bar 406, an advancement function 408, a cancel function 410, and a help function 412.

Figure 5:
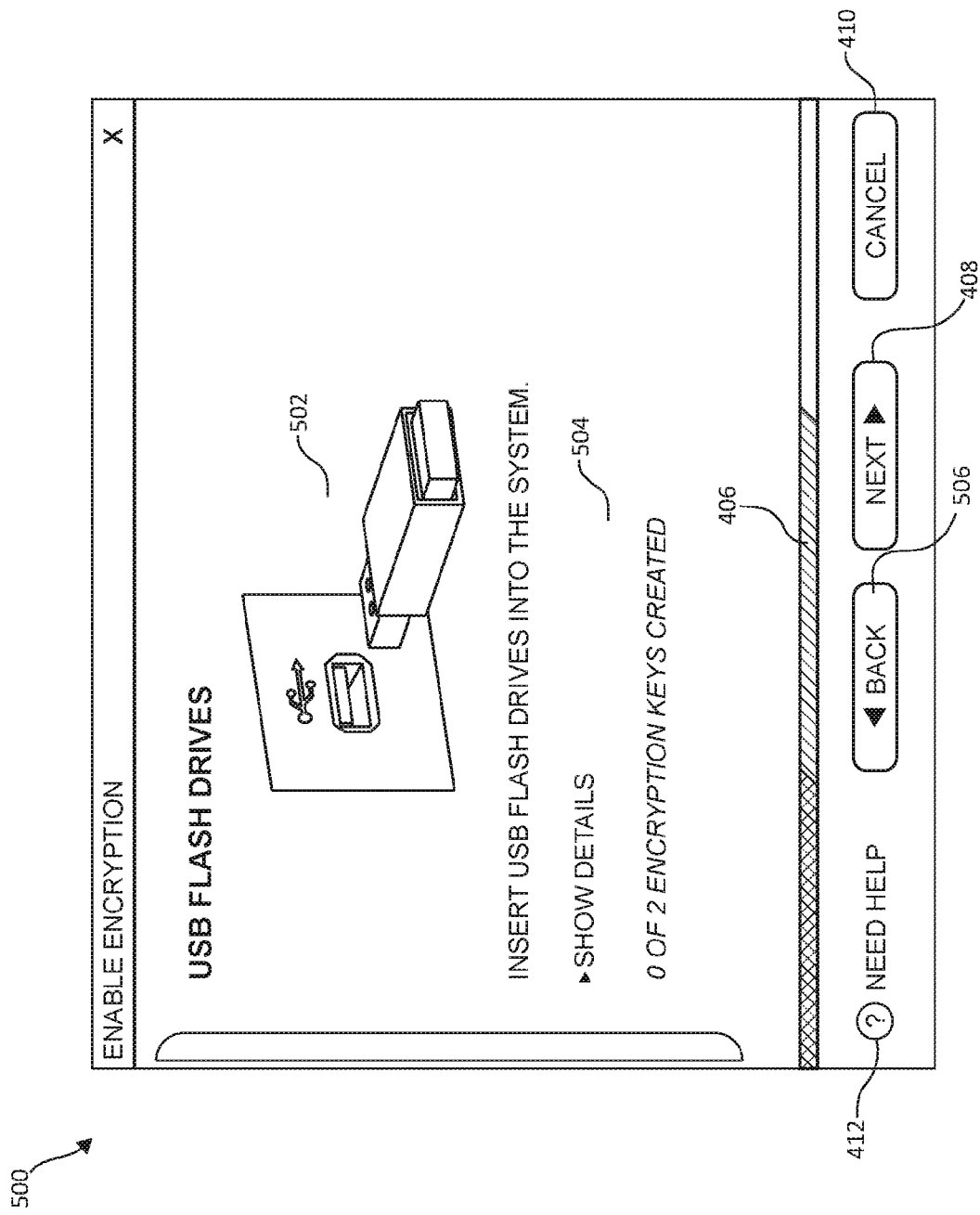
FIG. 5 is an additional block diagram illustrating an encryption key creation process in accordance with aspects of the present invention.

FIG. 5 depicts a block diagram 500 of the encryption key creation process once initialized. Diagram 500 illustrates portions of the automated wizard including an animated graphic 502, and a summary detail portion 504. The summary detail portion 504 may include instructions to the user (e.g. insert access key hardware) at the appropriate time. Also shown at this point in the encryption key creation process is a preceding function 506, the advancement function 408, and the cancel function 410. The automated wizard begins commencement of the encryption key creation process once access key hardware is detected to have been inserted into the computer system.

Figure 6:
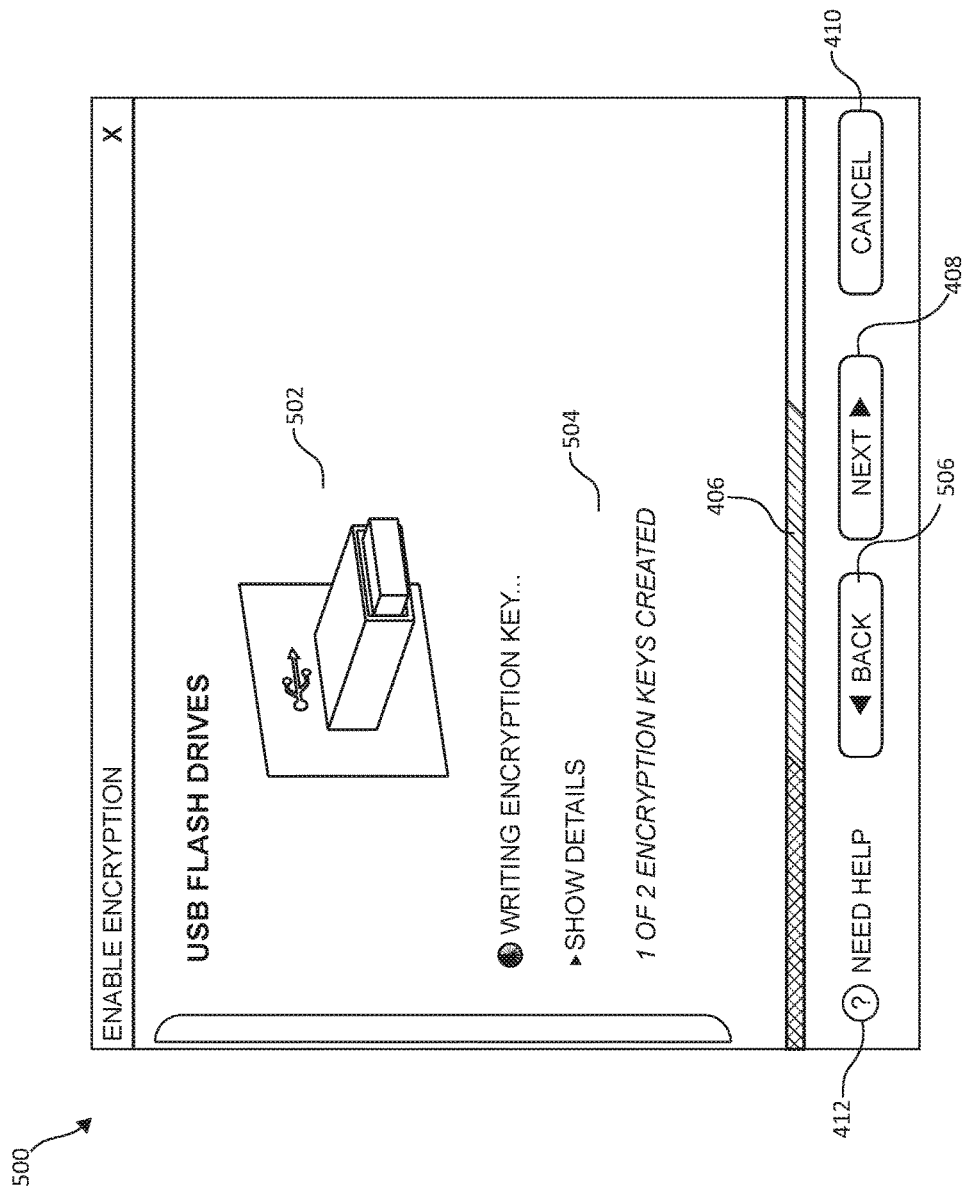
FIG. 6 is an additional block diagram illustrating an encryption key creation process in accordance with aspects of the present invention.

FIG. 6 depicts the block diagram 500 of the encryption key creation process once initialized subsequent to insertion of the access key hardware. The summary detail portion 504 includes a progress report of the encryption key creation process, as does the advancement of the progress bar 406. The summary detail portion 504 may include the current step of the encryption key creation process, an estimated time remaining, or other such details.

Figure 7:
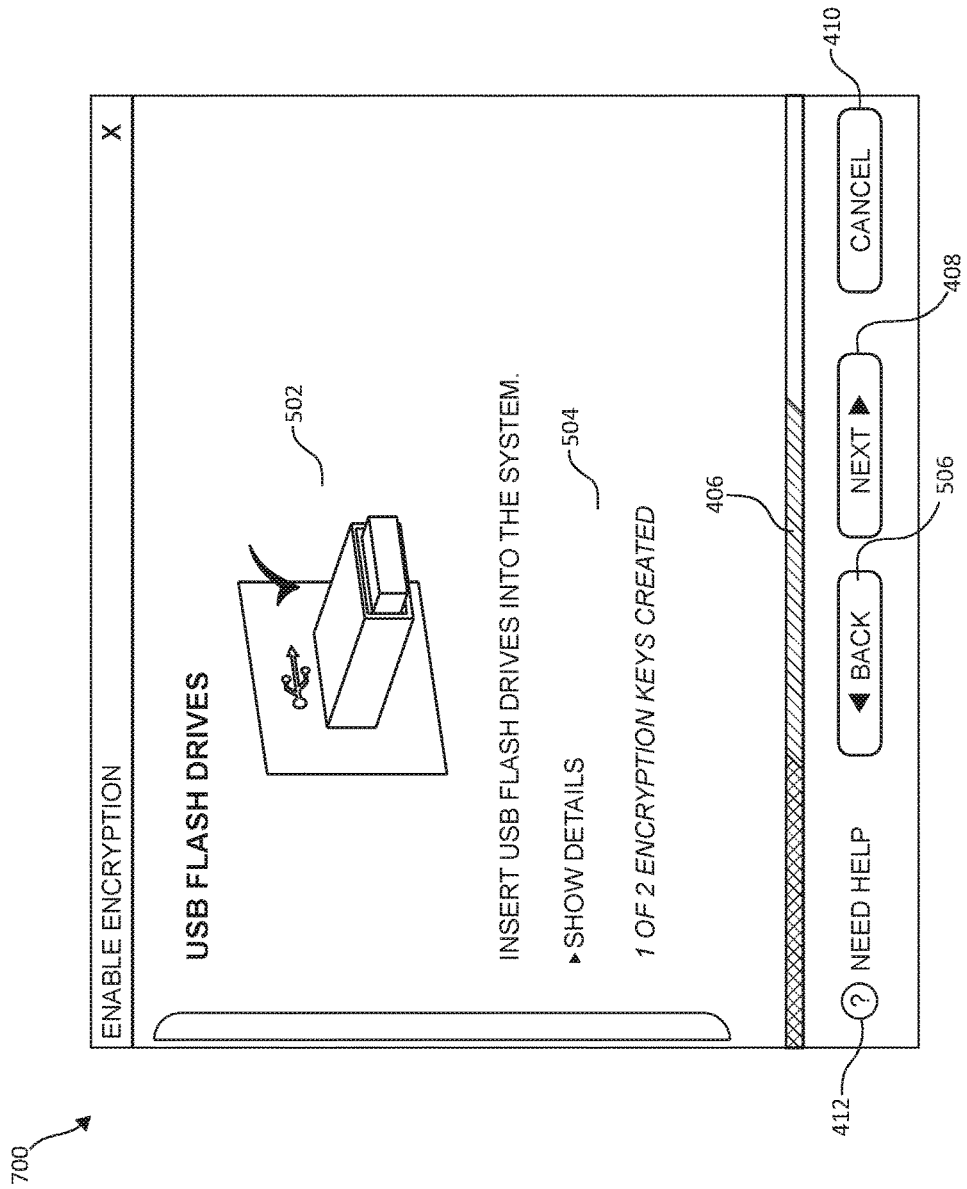
FIG. 7 is an additional block diagram illustrating an encryption key creation process in accordance with aspects of the present invention.

FIG. 7 depicts a block diagram 700 of the encryption key creation process upon completion of at least one access key hardware device successfully created. At this step, the animated graphic 502 may include a distinguishing color (e.g. green), or a mark (e.g. checkmark) to indicate the successful creation of the instant access key hardware device. The summary detail portion 504 may also include a progress report indicating the successful creation of the access key hardware, and provide instructions to insert another access key hardware device. Upon insertion of the subsequent access key hardware device, the automated wizard automatically commences the creation of the next encryption key, without the need to select the advancement function 408. This process continues until all of the needed encryption keys via the access key hardware devices have been created, as initially reported by the welcome prompt 402.

Figure 8:
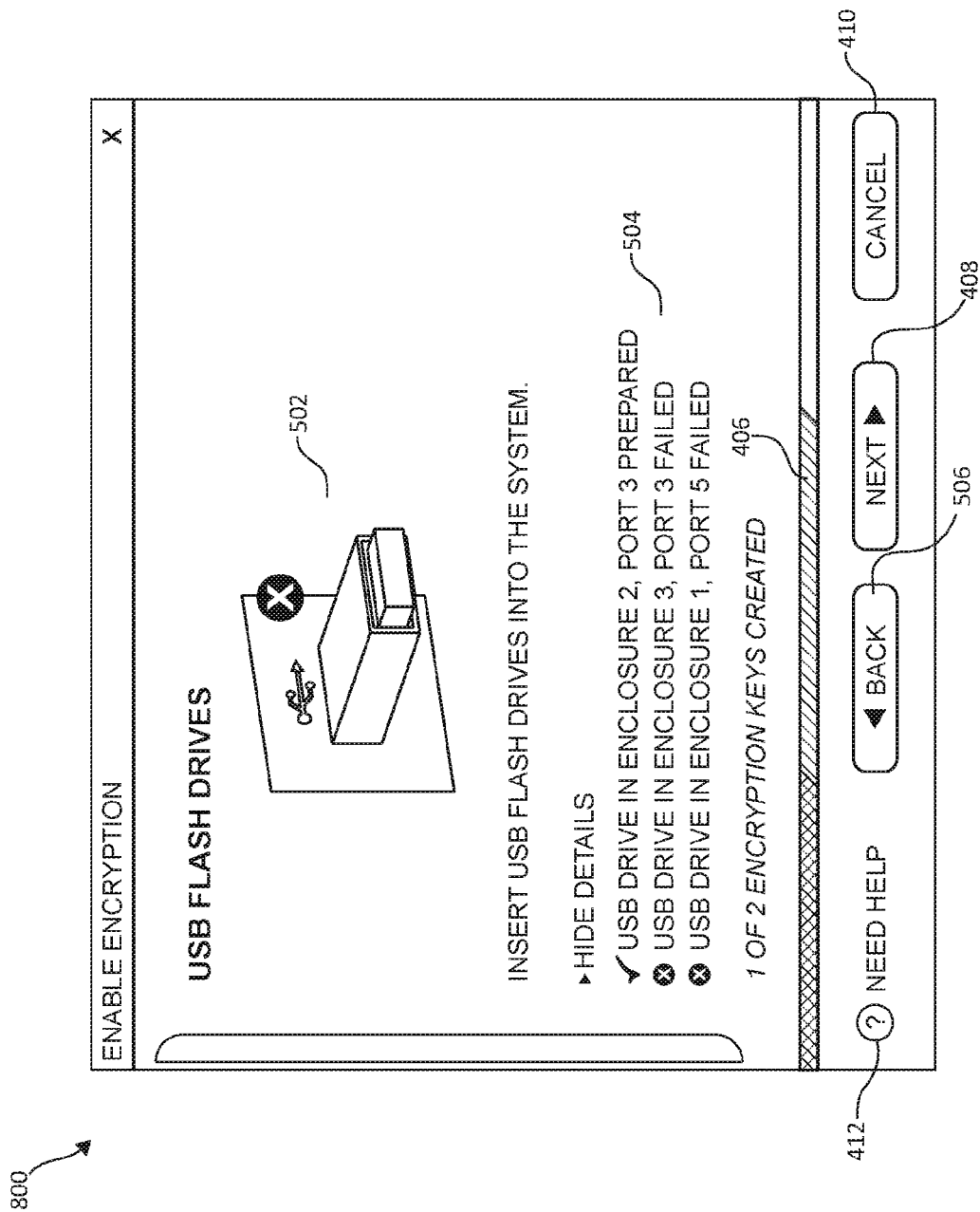
FIG. 8 is still an additional block diagram illustrating an encryption key creation process in accordance with aspects of the present invention.

FIG. 8 depicts a block diagram 800 of the encryption key creation process consequent to all of the needed encryption keys via the access hardware devices being either successfully or unsuccessfully created. The animated graphic 502 and summary detail portion 504 provides an overall summary of the encryption key creation process for each inserted access key hardware device. The summary detail portion 504 may include specific errors by maintaining a built-in log regarding each inserted access key hardware device. Encryption keys which have then failed to complete may be retried at this step without starting a new wizard. If all required encryption keys via the access hardware devices are successfully created, the data encryption function of the storage system will be allowed to be enabled. Conversely, if one or more of the needed encryption keys have failed to complete during the encryption key creation process, the data encryption function of the storage system will be blocked, and the advancement function 408 will not execute.

Figure 9:
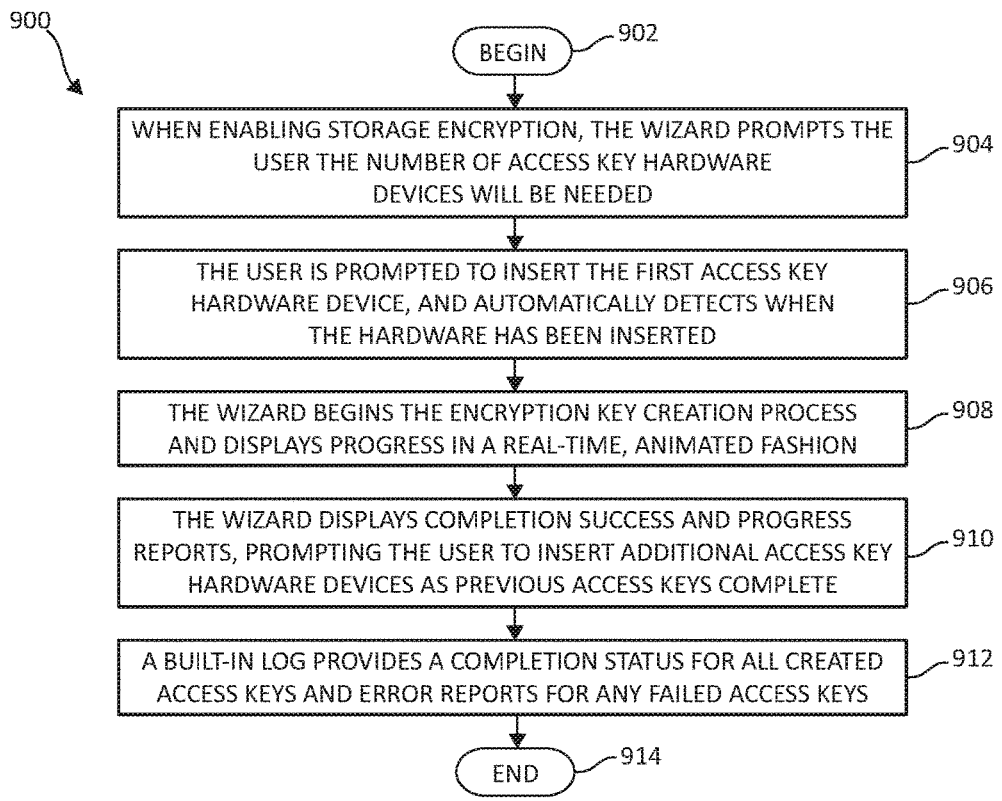
FIG. 9 is an additional flow chart illustrating a method for encryption enablement in a computer storage system in accordance with aspects of the present invention.

FIG. 9 illustrates an additional flow chart of a method 900 for encryption key enablement in a computer storage system. The method 900 may be performed in accordance with the present invention in any of the environments depicted in FIGS. 1-2, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 902, when enabling data encryption and beginning the encryption key creation process in the computer storage system, an automated wizard welcomes and prompts the user regarding the number of access key hardware devices that need to be created, as depicted in FIG. 4 (step 904). The user is then prompted to insert the first access key hardware device and automatically detects when the hardware has been inserted into the computer system, as depicted in FIG. 5 (step 906). The automated wizard begins the encryption key creation process on the inserted access key hardware device and presents the creation process in a real-time, animated fashion, as depicted in FIG. 6 (step 908). As each encryption key is completed, the automated wizard displays success and progress reports, and prompts the user to insert additional access hardware keys into the system for creation of additional encryption keys, as depicted in FIG. 7. The automated wizard begins the creation of the next encryption key automatically once the additional access hardware devices are detected to have been inserted (step 910). A built-in log provides a completion status and detailed error reporting for any failed encryption keys once all access key hardware devices have been attempted, as depicted in FIG. 8. Any failed encryption key attempts may then be retried without restarting the wizard, and the data encryption feature of the computer storage system is blocked until all needed encryption keys are successfully created (step 912). The method ends (step 914).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for encryption enablement in a computing storage environment, by a processor device, comprising:
    managing each step of an encryption key creation process for a computer storage system having a plurality of storage devices storing data served to a plurality of hosts using an automated wizard by interactively sensing inserted access key hardware and providing a real-time progress and error report of the encryption key creation process; wherein the encryption key creation process creates an encryption key stored on a secure external device comprising the access key hardware, the encryption key stored on the access key hardware used to control administrative access to and an encryption state of the computer storage system;
    displaying a number of pieces of the access key hardware needing to be created during the encryption key creation process;
    automatically initializing the encryption key creation process, without user input, when the automated wizard senses a first access key hardware has been inserted; and
    upon completion of the encryption key creation process performed on the first access key hardware, automatically re-initializing the encryption key creation process consequent to the automated wizard sensing that a second access key hardware has been inserted.

2. The method of claim 1, further including maintaining a log, by the automated wizard, of successful and unsuccessful attempts of the encryption key creation process; and re-initializing, by the automated wizard, the encryption key creation process on the unsuccessful attempts.

3. The method of claim 1, further including blocking encryption enablement of the computer storage system until the number of pieces of the access key hardware needing to be created are successfully created.

4. The method of claim 1, further including displaying the automated wizard using a Graphical User Interface (GUI).

5. The method of claim 1, wherein the access key hardware comprises an external media device.

6. A system for encryption enablement in a computing storage environment, the system comprising:
    at least one processor device, wherein the processor device:
    manages each step of an encryption key creation process for a computer storage system having a plurality of storage devices storing data served to a plurality of hosts using an automated wizard by interactively sensing inserted access key hardware and providing a real-time progress and error report of the encryption key creation process; wherein the encryption key creation process creates an encryption key stored on a secure external device comprising the access key hardware, the encryption key stored on the access key hardware used to control administrative access to and an encryption state of the computer storage system;
    displays a number of pieces of the access key hardware needing to be created during the encryption key creation process;

automatically initializes the encryption key creation process, without user input, when the automated wizard senses a first access key hardware has been inserted; and upon completion of the encryption key creation process performed on the first access key hardware, automatically re-initializes the encryption key creation process consequent to the automated wizard sensing that a second access key hardware has been inserted.

7. The system of claim 6, wherein the at least one processor device maintains a log, by the automated wizard, of successful and unsuccessful attempts of the encryption key creation process; and re-initializes, by the automated wizard, the encryption key creation process on the unsuccessful attempts.

8. The system of claim 6, wherein the at least one processor device blocks encryption enablement of the computer storage system until the number of pieces of the access key hardware needing to be created are successfully created.

9. The system of claim 6, wherein the at least one processor device displays the automated wizard using a Graphical User Interface (GUI).

10. The system of claim 6, wherein the access key hardware comprises an external media device.

11. A computer program product for encryption enablement in a computing storage environment, by a processor device, the computer program product embodied on a non-transitory computer-readable storage medium having computer-readable program code portions stored therein, the computer-readable program code portions comprising:

an executable portion that manages each step of an encryption key creation process for a computer storage system having a plurality of storage devices storing data served to a plurality of hosts using an automated wizard by interactively sensing inserted access key hardware and providing a real-time progress and error report of the encryption key creation process; wherein the encryption key creation process creates an encryption key stored on a secure external device comprising the access key hardware, the encryption key stored on the access key hardware used to control administrative access to and an encryption state of the computer storage system;

an executable portion that displays a number of pieces of the access key hardware needing to be created during the encryption key creation process;

an executable portion that automatically initializes the encryption key creation process, without user input, when the automated wizard senses a first access key hardware has been inserted and an executable portion that, upon completion of the encryption key creation process performed on the first access key hardware, automatically re-initializes the encryption key creation process consequent to the automated wizard sensing that a second access key hardware has been inserted.

12. The computer program product of claim 11, further including an executable portion that maintains a log, by the automated wizard, of successful and unsuccessful attempts of the encryption key creation process; and re-initializes, by the automated wizard, the encryption key creation process on the unsuccessful attempts.

13. The computer program product of claim 11, further including an executable portion that blocks encryption enablement of the computer storage system until the number of pieces of the access key hardware needing to be created are successfully created.

14. The computer program product of claim 11, further including an executable portion that displays the automated wizard using a Graphical User Interface (GUI).

15. The computer program product of claim 11, wherein the access key hardware comprises an external media device.

* * * * *